United States Patent
Fort

[19]

[11] Patent Number: 6,064,321
[45] Date of Patent: May 16, 2000

[54] LASER GUIDANCE SYSTEM FOR PROPELLER AIRPLANE

[76] Inventor: Eldon R. Fort, 12000 Briar Forest, #19, Houston, Tex. 77077

[21] Appl. No.: 09/236,276

[22] Filed: Jan. 22, 1999

Related U.S. Application Data

[60] Provisional application No. 60/072,299, Jan. 23, 1998.

[51] Int. Cl.[7] .................................................. G01C 21/00
[52] U.S. Cl. ........................ 340/979; 340/945; 340/971; 340/980
[58] Field of Search ..................................... 340/980, 945, 340/963, 967, 971, 974, 979; 244/1 R; 701/3, 9, 14; 345/7

[56] References Cited

U.S. PATENT DOCUMENTS

| | | | |
|---|---|---|---|
| 1,664,170 | 3/1928 | Hendry | 340/971 |
| 2,806,402 | 9/1957 | Ferris | 340/946 |
| 4,136,926 | 1/1979 | Sigler | 350/55 |
| 4,225,226 | 9/1980 | Davidson et al. | 356/1 |
| 4,227,776 | 10/1980 | Morton et al. | 350/285 |
| 4,227,860 | 10/1980 | Humphreys | 416/155 |
| 4,299,483 | 11/1981 | Grove et al. | 340/945 |
| 4,453,163 | 6/1984 | Garner et al. | 340/971 |
| 4,583,094 | 4/1986 | Mosier | 340/975 |
| 4,743,903 | 5/1988 | Morley | 340/980 |
| 4,825,194 | 4/1989 | Rasinski | 340/975 |
| 4,860,007 | 8/1989 | Konicke et al. | 340/173 |
| 5,181,028 | 1/1993 | Sharpe et al. | 340/974 |
| 5,287,104 | 2/1994 | Shemwell | 340/952 |
| 5,358,199 | 10/1994 | Hayes et al. | 340/979 |
| 5,614,897 | 3/1997 | Durnford | 340/973 |
| 5,884,224 | 3/1999 | McNabb et al. | 702/2 |

FOREIGN PATENT DOCUMENTS 2647-932  12/1990  France .

*Primary Examiner*—Brent A. Swarthout
*Attorney, Agent, or Firm*—Richard C. Litman

[57] ABSTRACT

A laser guidance system includes at least two laser beam generating devices that generate a beam which reflects off a reflective surface positioned on the backside of a propeller blade in order to indicate to a pilot in which direction the aircraft has deviated from a desired flight course. The reflective surface is placed on an area near the tips of the blades of a single engine aircraft propeller to provide a display surface to reflect the laser beam to create a light spot. The laser beam directs light to the left or right side of the nose of the airplane onto the circular path the reflective surfaces made when the propeller spins. The resulting light spots indicate which direction, left or right, a pilot should maneuver the aircraft to follow a desired flight course.

6 Claims, 3 Drawing Sheets

LASER GUIDANCE SYSTEM FOR PROPELLER AIRPLANE

CROSS-REFERENCE TO RELATED APPLICATION

This application claims the benefit of U.S. Provisional Patent Application Ser. No. 60/072,299, filed Jan. 23, 1998.

BACKGROUND OF THE INVENTION

1. Field of the Invention

The present invention relates generally to agricultural airplane guidance systems, and more particularly, to laser guidance devices that assist pilots in navigation by displaying present flight data by means of a reflective propeller and laser beam that indicate to a pilot which flight direction to direct their aircraft in order to follow a desired flight path.

2. Description of Related Art

Devices that display information to assist a pilot to maintain a flight path are common and are known in the patent literature. There are many devices and methods to display present flight information to a pilot regarding flight characteristics of an aircraft. However, some flight plans have performance or safety characteristics that are adversely affected when a pilot must redirect his or her line of sight to view a display. Therefore, displays that reduce the distance over which a pilot must redirect his or her line of sight during flight are desired.

For example, when spraying crops with an airplane, the altitude of the aircraft is very low and the flight course is even more exacting. To fly a flight course as precisely as possible requires momentary and often instantaneous feedback regarding the flight direction of the aircraft, therefore requiring that the pilot be able to quickly and easily view the flight data to insure flight safety.

The patent literature provides various and different feedback displays. U.S. Pat. No. 5,181,028 issued to Tom Sharpe et al. on Jan. 19, 1993 discloses a display device in the form of eye glasses that are worn by a pilot. A three dimensional display provides roll, pitch and heading indicators within a spherical grid on a cathode ray tube (CRT) screen. As discussed, the requirement that a pilot redirect his sight to read a display is not efficient in some flight plans thus making this type of apparatus undesirable.

U.S. Pat. No. 4,860,007 issued to Michael Konicke et al. on Aug. 22, 1989 teaches an integrated flight display generated on a CRT. Again, redirecting the sight of a pilot to view the CRT during flight limits the usefulness of the display and hinders safety under certain flight situations.

U.S. Pat. No. 5,614,897 issued to Simon Durnford on Mar. 25, 1997 describes an instrument display panel that indicates aircraft speed and heading. The pilot must redirect his or her line of sight to read the display panel. Placement of the display panel near the line of sight of the pilot reduces the distance over which a pilot must redirect his or her line of sight. However, a display panel would have to be attached to the aircraft and a pilot would have to redirect his line of sight to at least the nose of the aircraft to see the display panel. Flight displays that require a pilot to redirect his or her line of sight during flight hinder the ability of the pilot to navigate and fly safely.

To date, inventions display flight information using CRTs or liquid display technology that are attached within the aircraft cockpit or on the nose of the aircraft. Present aircraft displays suffer from the limitation that a pilot is required to redirect their line of sight away from flying the aircraft, at least momentarily, and toward a display unit located on the aircraft to interpret the information displayed.

None of the above inventions and patents, taken either singly or in combination, is seen to describe the instant invention as claimed.

SUMMARY OF THE INVENTION

Accordingly, it is a principal object of the invention to disclose a device that decreases the distance a pilot must redirect a line of sight to obtain information from a display.

Another object of the invention is to create a sighting mechanism employing the rotation of an aircraft propeller located in front of the pilot.

Still another object of the invention is to provide a laser guidance system that allows the pilot to remain focused on the path of plane while providing the pilot with information about deviations from the desired course of flight.

It is an object of the invention to provide improved elements and arrangements thereof in an apparatus for the purposes described which is inexpensive, dependable and fully effective in accomplishing its intended purposes.

The laser guidance system for agricultural airplanes of the present invention projects a laser beam onto a reflective surface placed on the back side of the blades of a propeller. A light spot created by the reflected light from the propeller forms a sighting device to the left or right of the nose, which indicates to a pilot whether the aircraft has veered off the desired flight path as well as the direction towards which to fly in order to direct the aircraft to the correct flight path. The laser beam is generated by receiving input from on-board commercially available guidance control devices.

Conventional steering lights require that a pilot momentarily look away from the flight path to see the steering lights which creates a dangerous situation because when an airplane is used to spray chemicals, it is essential that the pilot's attention be given to possible obstacles because the aircraft may be flying only a few feet off the ground at 150 mph. Furthermore, conventional steering lights are susceptible to washout by direct sunlight because they are disposed below the pilot's line-of-sight in a forward location within the cockpit. This is especially true for a turbine plane with its long sloping nose.

The basic system of the present invention employs two red lasers located in the cockpit directly behind the windshield. The lasers are adjusted to display the eye-safe beams horizontally, spaced approximately two feet apart. The laser beams are turned on and off to indicate in which direction to steer the plane.

The laser guidance system of the present invention makes use of conventional GPS (Global Positioning System) receivers. GPS receivers are routinely used for swath guidance by aircraft performing chemical spraying. The laser based indicator of the present invention can be interfaced with the GPS light bar within a cockpit and mimics the programmed distance-off-line indication a using its multiple beams.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
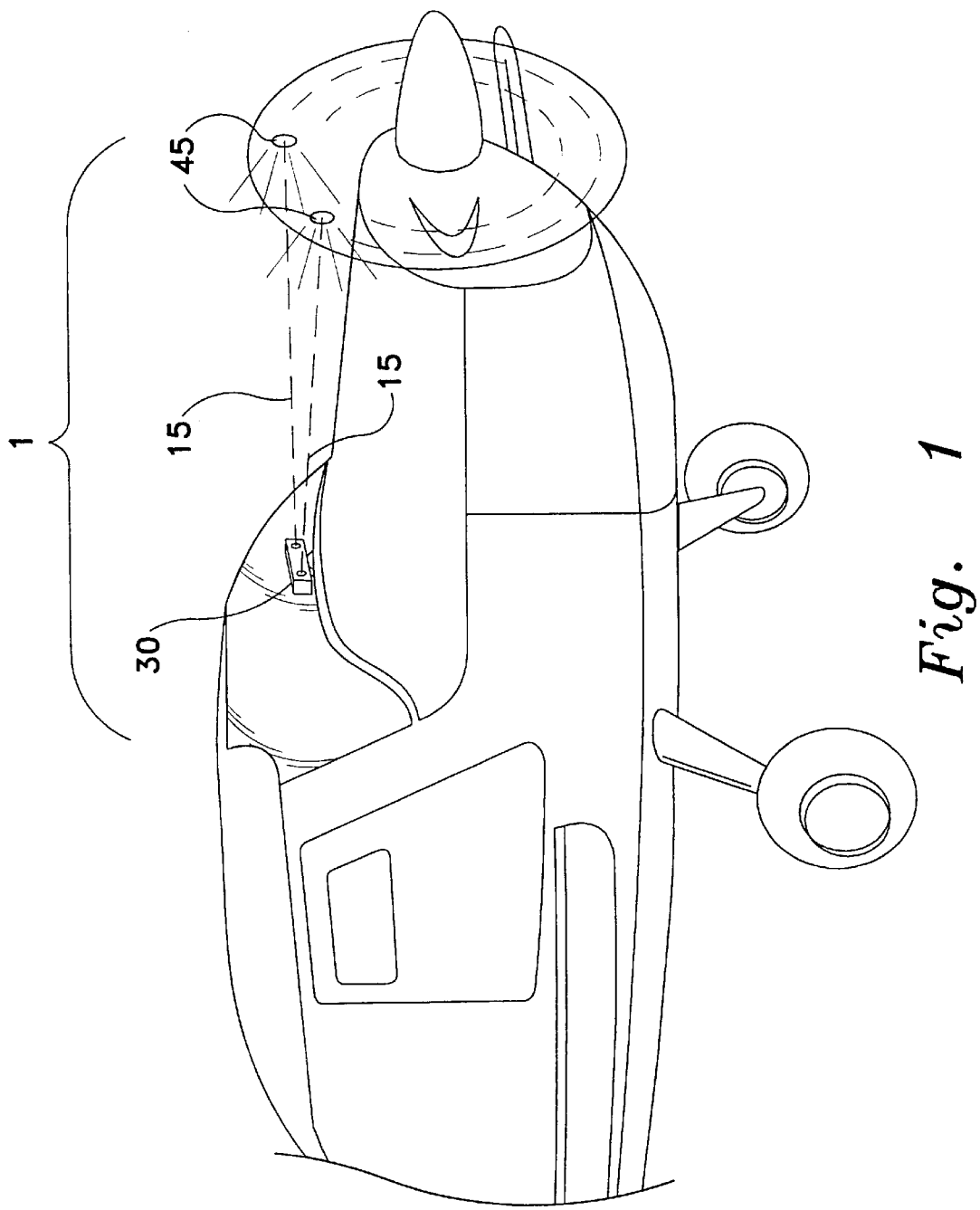
FIG. 1 is an environmental, perspective view of a laser guidance system for agricultural airplane according to the present invention.

The laser guidance system for agricultural airplanes 1 of the present invention comprises at least two laser beams 15 which reflect off a reflective surface 20 and which indicates to a pilot in which x or y direction the aircraft has deviated from a desired flight course. Placement of the reflective surface 20 near the tips of the blades 10 of a single engine aircraft nose propeller 5 provides a display surface to reflect the laser beam 15. The laser beam 15 reflects off the back side of the spinning propeller blades 10 and creates a light spot 45 visible to the pilot. The laser beam 15, when generated, directs light to the left side 35 or right side 40 of the circular path that the reflective surfaces 20 take when the propeller 5 spins and thereby indicates which direction, left or right, a pilot should maneuver the aircraft to follow a desired flight course.

The laser beam 15 is generated by input from commercially available guidance control systems. The laser guidance system for agricultural airplanes 1 uses the existing commercially available aircraft direction sensor system of an aircraft. The aircraft direction sensor system determines and monitors the position of the aircraft. Usually an aircraft direction sensor provides all three (x, y and z) coordinates to describe the location of an aircraft, among other desirable flight information.

As alluded to above, there are many display systems available to indicate to a pilot the direction of their aircraft, among other flight data that is determined by the flight direction sensor system. However, display systems attached to an aircraft are limited in their ability to display information due to the fact that a pilot is required to redirect a line of sight away from his or her flight duties in order to read the display.

A flight direction sensor system transmits the flight data that it receives from its sensors/processors to a display unit. A display unit correlates the data it receives from the flight sensor system into a form that can be read and interpreted by a pilot. A display may take many forms, such as a digital display (a simple numeric character), an analog display (a needle or object that moves a certain distance which corresponds to a number on a magnitude scale usually inset behind the object), one or more colored lights, or one or more blinking lights, to name only a few types displays. The information corresponding to each display device has its own predefined meanings and information value.

However, the preferred embodiment of the laser guidance system for agricultural airplanes 1 includes means for generating two laser beams 15 directed at three rotating reflective surfaces 20 to display the desired information to a pilot, as shown in FIG. 1, and is herein called a flight instrument display system. One laser beam 15 is directed to the left side 35 of nose (that is, the pilot's left side, also referred to as cockpit left) onto the path of the propeller 5, while the other laser beam 15 is directed to the right side 40 of the nose (that is, the pilot's right side, also referred to as cockpit right) onto the path of the propeller 5.

The pilot enters desired flight path information into a standard flight control system used in aircraft. The flight control system compares the location of the aircraft sensed by the direction sensor system to the desired flight course and determines whether there is error. When the location of the aircraft and the desired location of the aircraft do not correspond, a signal is generated and sent to the laser beam display unit 30, similar to the signal sent to any other display unit. Only errors in the x-y direction are disclosed in the preferred embodiment; however, the display may be used to signal many other items.

The signal sent to the laser beam display unit 30 instructs the laser beam display unit 30 to generate and direct a left laser beam 15 or a right laser beam 15, depending on the path error. If the aircraft is to the left of the desired course, the aircraft display unit 30 directs a laser beam 15 to the right side 40 of the path of the propeller 5 (cockpit right). The laser beam 15 directed to the right side 40 of the propeller 5 notifies a pilot that he is to the left of his desired flight course. If the aircraft is to the right of the desired course, the aircraft display unit 30 directs a laser beam 15 to the left side 35 of the path of the propeller 5 (cockpit left). A laser beam 15 directed to the left side 35 of the propeller 5 notifies the pilot that he is to the right of his desired flight course.

The laser beam 15 is generated until the flight control system determines that the aircraft has returned to the desired flight course. When the flight control system determines that the aircraft is on the desired path, a signal is sent to the laser beam display unit 30 to stop generating the laser beam 15. When no laser beam 15 is directed toward the circular path of the reflective surface 20, there is no light spot 45 displayed to the pilot.

The laser beam display unit 30 can be located anywhere on the front of the aircraft. There should be no obstacles to interfere with or block the path which the laser beam follows before the laser beam 15 reflects off the blades 10 of the propeller 5. Nor should obstacles be present that prevent the pilot from observing the light spot 45 generated by the reflective surface 20. The preferred embodiment shown in FIG. 1 places the laser beam display unit 30 in the cockpit just behind the cockpit window.

Figure 2:
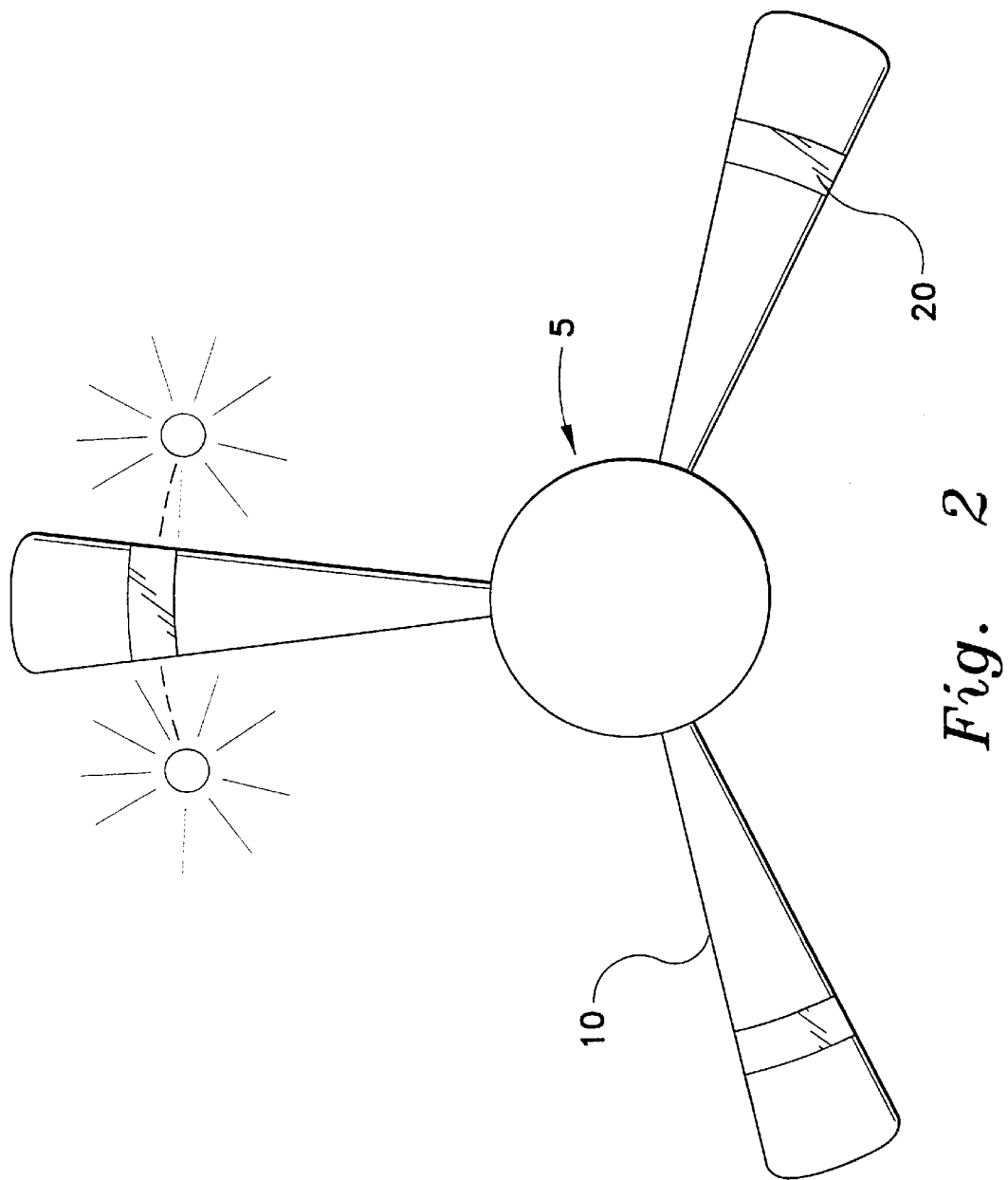
FIG. 2 is a view from the back side of a stationary three blade propeller from within a cockpit.
Figure 3:
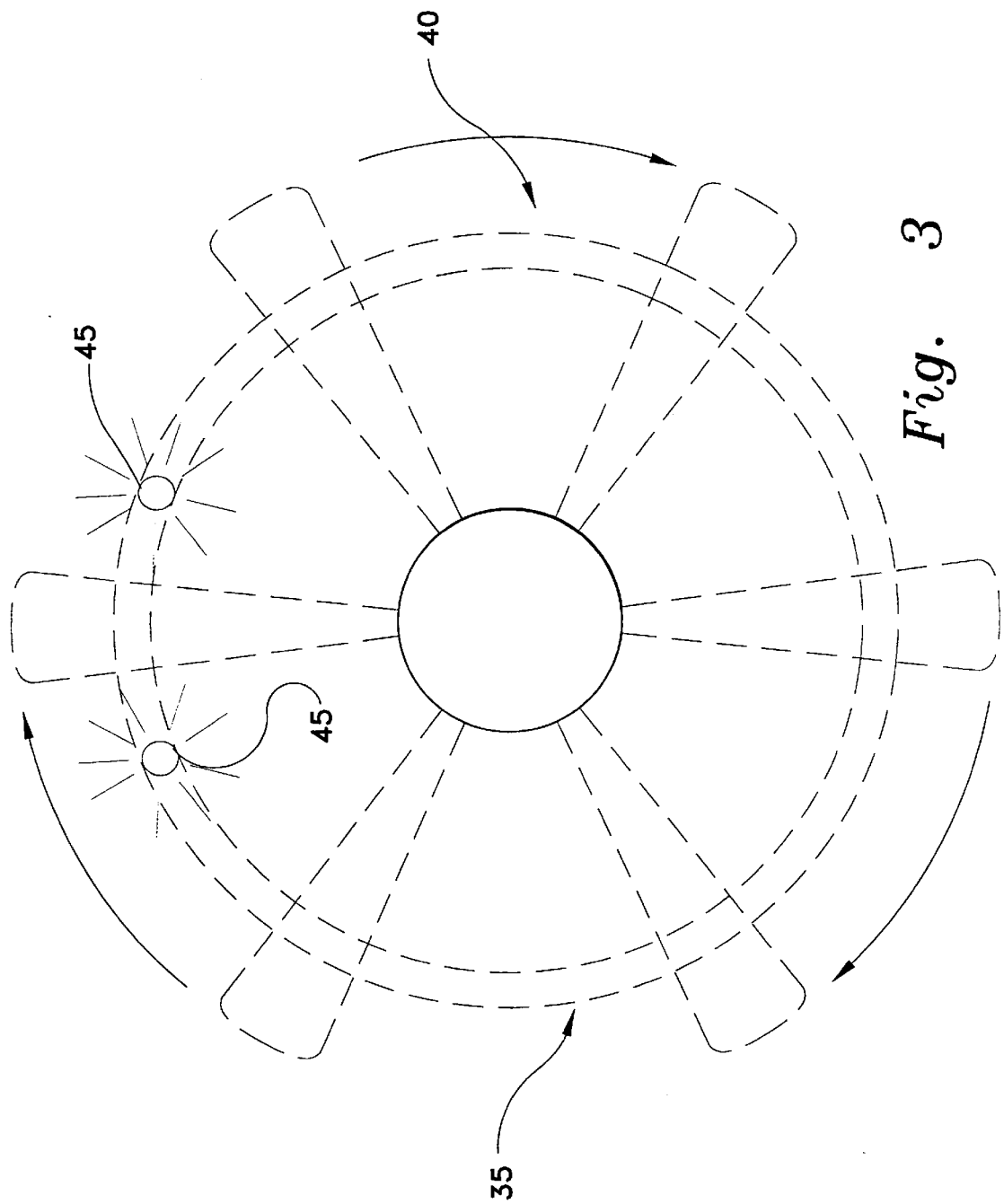
FIG. 3 is a view from the back side of a rotating three blade propeller from within a cockpit that outlines the path of the reflective surfaces and propeller when they are spinning as would be seen by a pilot.

A reflective surface 20 is applied to the back side of the blade 10 of the propeller 5. The reflective surface 20 is preferably placed just before the tip or outer end of each blade 10. The preferred embodiment shown in FIG. 2 shows a three blade propeller with a reflective surface 20 on each blade 10. The reflective surface 20 may be placed on one or all blades of the propeller 5. The reflective surface 20 may be placed at any position along the length of the blade 10 of the propeller 5 or even along the whole blade 10. FIG. 2 shows the reflective surfaces 20 placed at equidistant locations along the blades 10 of the propeller 5.

When the propeller 5 spins, a virtual circle is created by the reflective surfaces 20. A laser beam 15 may be directed at any location on the circle created by the reflective surfaces 20. The width or circumference of the circle is determined by the width of reflective surfaces 20 placed on the blades 10. Directing a laser beam 15 onto the circle created by the spinning reflective surfaces 20 reflects the laser beam 15 in the form of light.

By directing the laser beam 15 at a reflective surface 20, a light spot 45 is generated by the reflected light. The light spot 45 displays information to the pilot regarding the course of the aircraft. The generation of a light spot 45 in front of the pilot within the circular path the propeller 5 indicates to the pilot that the aircraft is not on the desired course. The light spot 45 may be any color by directing a laser beam 15 of a desired color. The preferred embodiment uses a red laser beam 15 and the light spot 45 displayed to the pilot is thus red.

A laser beam 15 may be directed at any point on the left side 35 or right side 40 of the circle created by the reflective surfaces 20. The appearance of a light spot 45 on the left side of the circle alerts the pilot that the aircraft is to the right of its desired path and the plane must be turned to the left to correct course. Conversely, the appearance of a light spot 45 at any point on the right side 40 of the circle notifies the pilot that the aircraft is to the left of the desired path and the plane must be turned to the right to correct course. In the preferred embodiment, the laser beams 15 are directed toward the top of the circle made by the rotating reflective surfaces 20. Reflection of the laser beams 15 at the top of the circle will create a light spot 45 near the top of the path of the propeller 5. Creating a light spot 45 as close as possible to the line of sight of the pilot is integral to the laser guidance system for agricultural airplanes 1.

The line of sight of the pilot when flying is primarily just above or at the top of the propeller 5 on a single engine aircraft. In airplanes flown by pilots while spraying crops, or in crop dusting planes, the pilot's line of sight is focused almost exclusively immediately above the propeller 5. The application of the laser guidance system 1 of the present invention to crop dusting aircraft is readily evident. The preferred embodiment of the laser guidance system provides a display surface that is very close to the line of sight of a pilot when crop dusting. However, there are many other applications to which the laser guidance system of the present invention may be applied, for example, in applications involving student pilots looking down toward a runway to land, the laser beams 15 may be directed to a spot lower on the circle made by the reflective surfaces 20, thereby assisting the student pilot to line up the aircraft with the runway.

The reflective surfaces 20 may be placed and the laser beam may be directed at any location on the propeller 5 to create a light spot 45. Light spots 45 may be generated to correspond to many different lines of sight of a pilot when flying to provide many types of information. Light spots 45 are not limited to providing direction information to a pilot. A light spot 45 may be used for many other purposes.

The laser guidance system of the present invention significantly enhances the process of in-flight course correction. The laser guidance system of the present invention greatly reduces the possibility of an accident due to the pilot's eyes being diverted from the flight path to observe conventional steering lights. The laser based indicator light is positioned in the pilot's line-of-sight at all times, therefore, the pilot's eyes never deviate from the flight path of the plane. The laser based indicator of the present invention can be used in any application that requires the visual display of positional information. The laser beams could be projected on to windshields or on to exterior clear surfaces with reflective targets.

The preferred embodiments of the present invention disclosed herein are intended to be illustrative only and are not intended to limit the scope of the invention. It should be understood by those skilled in the art that various modifications and adaptations of the present invention as well as alternative embodiments of the present invention may be contemplated. Therefore, it is to be understood that the present invention is not limited to the sole embodiments described above, but encompasses any and all embodiments within the scope of the following claims.

I claim:

1. A laser guidance system in combination with an airplane having a propeller comprising:

a reflective strip on the back side of each blade of a propeller wherein said reflective strips define a circular path when said propeller is rotating; and a laser beam generating unit interfaced with a global positioning system receiver wherein said laser beam generating unit generates at least one laser beam that reflects off of said reflective strips to provide guidance information to a pilot.

2. The laser guidance system according to claim 1, further comprising:

a switching device for turning the laser beam on and off wherein the input for said switching device is derived from a flight instrument control system.

3. The laser guidance system according to claim 2, wherein:

said switching device causes the laser beam to be turned on and off with variations in actual position of the airplane sensed by said flight instrument control system.

4. The laser guidance system according to claim 2, wherein:

said laser device generates a beam directed onto a point on said circular path which corresponds to the direction in which an aircraft is turned to correct the difference between the actual direction of said aircraft and the desired direction of said aircraft as determined by said flight instrument control system.

5. The laser guidance system according to claim 1, wherein:

said airplane has a plurality of blades on said propeller, and said reflective surface is positioned on each of said blades at a distance equidistant from the center of said propeller.

6. A method for correcting the flight path of an airplane comprising:

projecting a laser beam from a laser beam generating unit housed inside a cockpit of an aircraft onto a reflective surface disposed on the rear surfaces of the blades of a propeller whereby the location of the reflection of said projected laser beam on said propeller blades is determined by a flight instrument control system; and steering said aircraft in the direction of said reflection of said projected laser beam.

* * * * *